United States Patent [19]

Noda

[11] Patent Number: 5,246,187

[45] Date of Patent: Sep. 21, 1993

[54] BAITCASTING REEL HAVING A CLUTCH RESTORING DEVICE

[75] Inventor: Hideo Noda, Sakai, Japan

[73] Assignee: Shimano, Inc., Osaka, Japan

[21] Appl. No.: 777,623

[22] Filed: Oct. 16, 1991

[30] Foreign Application Priority Data

Oct. 18, 1990 [JP] Japan ............................ 2-109522[U]

[51] Int. Cl.⁵ .................................................. A01K 89/015
[52] U.S. Cl. .................................................. 242/261
[58] Field of Search ................ 242/259, 260, 261, 262

[56] References Cited

U.S. PATENT DOCUMENTS

| | | | |
|---|---|---|---|
| 2,686,016 | 8/1954 | Kilian | 242/260 |
| 2,760,357 | 8/1956 | Burns | 242/260 |
| 4,281,808 | 8/1981 | Noda | 242/261 |
| 4,341,366 | 7/1982 | Kawada | 242/261 |
| 4,564,158 | 1/1986 | Moosberg et al. | 242/261 |
| 4,824,046 | 4/1989 | Emura et al. | 242/261 |
| 4,850,550 | 7/1989 | Aoki | 242/261 |

*Primary Examiner*—Katherine Matecki
*Attorney, Agent, or Firm*—Dickstein, Shapiro & Morin

[57] ABSTRACT

A baitcasting reel includes a clutch mechanism interposed between a spool and a handle, a clutch restoring device, and a checking device. The clutch restoring device is operable, when the handle is turned in a direction to wind up a fishing line with the clutch mechanism disengaged, for restoring the clutch mechanism to an engaged position. The checking device is switchable to prevent the clutch mechanism from being restored to the engaged position.

7 Claims, 5 Drawing Sheets

BAITCASTING REEL HAVING A CLUTCH RESTORING DEVICE

BACKGROUND OF THE INVENTION

1. Field of the Invention

This invention relates to a baitcasting reel, and more particularly to a baitcasting reel having a device for restoring a clutch mechanism disposed between a spool and a handle to an engaged position when, with the clutch mechanism disengaged, the handle is turned in a direction to take up a fishing line.

2. Description of the Related Art

The clutch restoring device in a conventional baitcasting reel as constructed above is called an auto clutch. In the baitcasting reel with casting and reeling repeated frequently, the clutch mechanism is engaged automatically whenever the handle is turned in the line winding direction, to avoid the trouble of engaging the clutch mechanism after casting.

With the baitcasting reel, the angler swings a fishing rod at a relatively high speed for casting a bait after disengaging the clutch mechanism. Therefore, when the handle touches the hand of the angler not playing the main part of the swinging action or other part of his or her body, a strong force may act on the handle to turn the handle in the line winding direction.

With a strong force acting to turn the handle in the line winding direction, the clutch restoring device will move the clutch mechanism to an engaged position. As a result, the fishing line may be broken or the clutch mechanism may be damaged. Thus, there is room for improvement.

The fishing line is broken for the following reason. An ordinary reel has a one-way clutch for preventing backward rotation of the spool and allowing rotation in the line winding direction only. When the clutch mechanism is engaged at a casting time as noted above, unwinding of the fishing line from the spool is prevented, and the fishing line is broken by inertia of the bait. The clutch mechanism is damaged for the following reason. The spool rotates at high speed at a casting time. When the clutch mechanism is engaged in such a situation, the clutch mechanism connects a part rotating at high speed and a part nearly in a standstill state.

SUMMARY OF THE INVENTION

The object of the present invention is to provide an improved baitcasting spool which checks engagement of the clutch mechanism when a force acts to turn the handle in the line winding direction at a casting time.

The above object is fulfilled, according to the present invention, by a baitcasting reel having a clutch restoring device as noted hereinbefore, which comprises a checking device for preventing the clutch mechanism from being restored to an engaged state by the restoring device, the checking device being switchable between a position to allow restoration of the clutch mechanism to the engaged state by the restoring device, and a position to prohibit the restoration.

This baitcasting reel has the following functions and effects.

In the construction shown in FIGS. 1 through 4, for example, when the clutch mechanism C is disengaged, the restoring device R is operable to apply a braking force to sliding movement of a control plate 25 operatively connected to the clutch mechanism C. Consequently, when a handle 7 is turned in a line winding direction, the braking force applied to the control plate 25 checks engagement of the clutch mechanism C.

It is also possible according to the present invention to construct the checking device S as shown in FIGS. 6 through 8. In the construction shown in FIG. 6, a toggle spring 26 for determining a position of the control plate 25 prevents a clutch engaging operation of the control plate 25. In the construction shown in FIG. 7, a switching piece 33 is switchable to a position not to transmit an operating force of the restoring device R to the control plate 25 when the handle 7 is turned in the line winding direction. In the construction shown in FIG. 8, a limiter piece 37 is operable to prevent transmission of a turning force from the handle 7 to an arm 35 acting as the restoring device R.

The checking device S may be placed in an inoperative position, so that the baitcasting reel is used just as in a conventional way that does not involve strong swinging of a fishing rod, for example.

Thus, a modification consisting in provision of the checking device produces the effect of checking engagement of the clutch mechanism when a strong turning force is applied to the handle in the line winding direction at a casting time. This improved reel may also be used in the same way a conventional reel is used, depending on types of fishing or preferences of the angler.

Other features and advantages of the present invention will be apparent from the following description.

BRIEF DESCRIPTION OF THE DRAWINGS

The drawings show a baitcasting reel according to the present invention, in which.

DETAILED DESCRIPTION OF THE PREFERRED EMBODIMENTS

Figure 1:
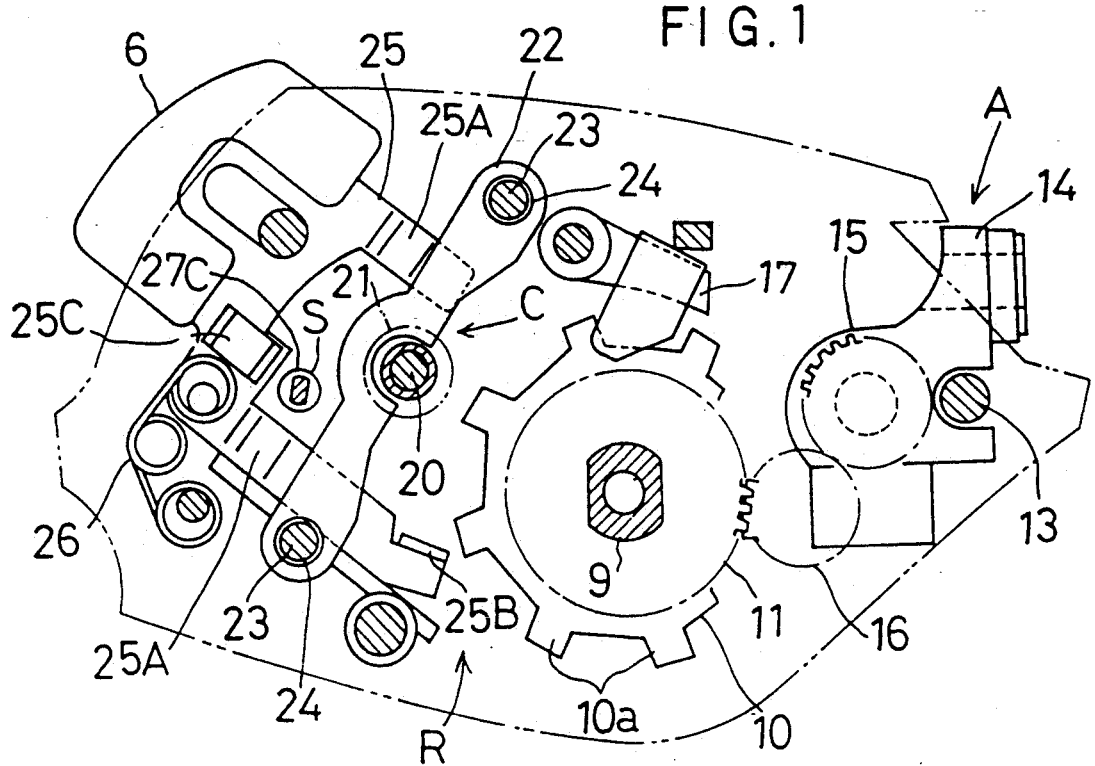
FIG. 1 is a side view of a clutch operating system in a clutch engaging state.

A baitcasting reel according to the present invention will be described in detail hereinafter with reference to the drawings.

Referring to FIGS. 1 through 5, a baitcasting reel for mounting on a fishing rod (not shown) comprises a level wind mechanism A, a spool 2 and a thumb rest 3 arranged in front, middle and rear positions, respectively, between left and right side cases 4 and 5. The right side case 5 includes a push knob 6 mounted in a rearward position thereof, which acts as a control device depressible to place the spool 2 in a free rotation state. The reel further comprises a handle 7 disposed outwardly at a right side of the right side case 5 for winding up a fishing line, and a star-shaped drag adjuster 8 disposed between the right side case 5 and handle 7.

Figure 5:
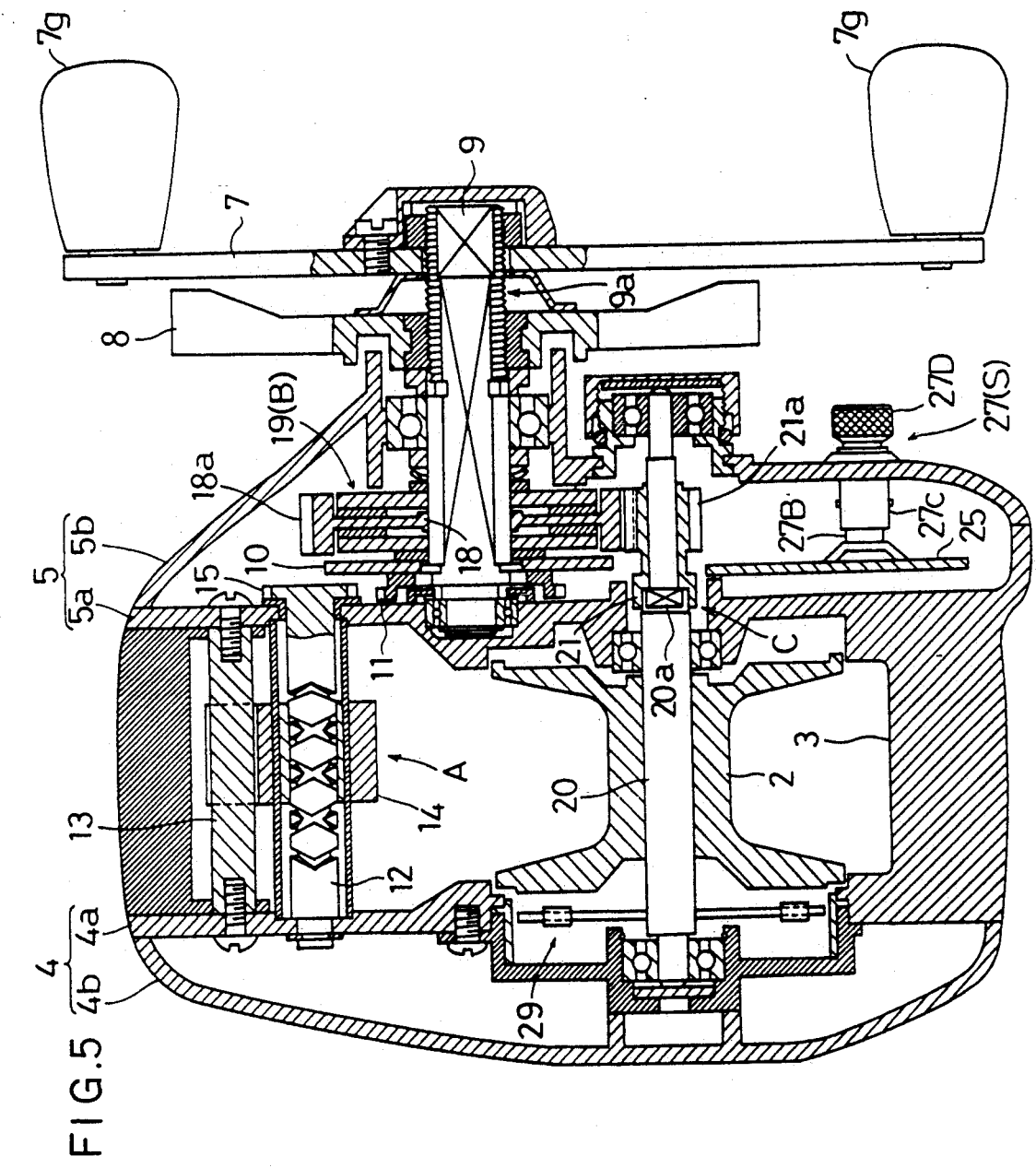
FIG. 5 is a sectional plan view of a baitcasting reel.

As shown in FIG. 5, each of the side cases 4 and 5 is formed of a side plate 4a or 5a and an outer wall 4b or 5b acting as an outer cover of the side plate 4a or 5a. A rotary shaft 9 connected to the handle 7 extends through a space between the right side plate 5a and outer wall 5b.

This reel includes a pair of grips 4g mounted on the handle 7 at different distances from an axis of the rotary shaft 9. The angler may use these grips 7g selectively at a reeling time.

The drag adjuster 8 is meshed with an outward screw portion 9a of the rotary shaft 9. The rotary shaft 9 further carries, mounted on inward positions thereof, a drag mechanism B, a ratchet wheel 10, and an interlocking gear 11 for transmitting drive to the level wind mechanism A.

The level wind mechanism A includes a line guide 14 driven by rotation of a screw shaft 12 to reciprocate along a guide rod 13. The screw shaft 12 includes an end gear 15 for receiving the drive from the interlocking gear 11 through an intermediate gear 16.

The ratchet wheel 10 includes a plurality of teeth 10a projecting radially therefrom. A pawl 17 is disposed adjacent the ratchet wheel 10 and urged in a direction to engage the teeth 10a, thereby to prevent backward rotation of the rotary shaft 9.

The rotary shaft 9 supports a free rotation disk 18 having an output gear 18a peripherally thereof. The drag mechanism B sandwiches this free rotation disk 18, and includes friction plates 19 for torque transmission. Their frictional force is adjustable based on a pressing force controlled by turning the drag adjuster 8.

The spool 2 has a spool shaft 20 rotatable therewith. The spool shaft 20 includes an engaging portion 20a formed on an intermediate position thereof. Further, the spool shaft 20 supports a slide element 21 freely rotatably mounted thereon to be engageable with the engaging portion 20a. The slide element 21 has an input gear 21a meshed with the output gear 18a of the free rotation disk 18. Thus, when the handle 7 is turned with the slide element 21 engaging the engaging portion 20a, the spool 3 is rotated to wind up the fishing line.

The level wind mechanism A is operable at a line winding time to uniform a line winding amount along the spool 2. The ratchet wheel 10 prevents backward turning of the handle 7 at this time.

The slide element 21 and engaging portion 20a constitute a clutch mechanism C. For unwinding the fishing line, the slide element 21 is set to an unillustrated position to disengage the clutch mechanism C. By swinging the fishing rod in this state, the fishing line is drawn out with the spool 2 rotating freely under tension of the line.

Figure 2:
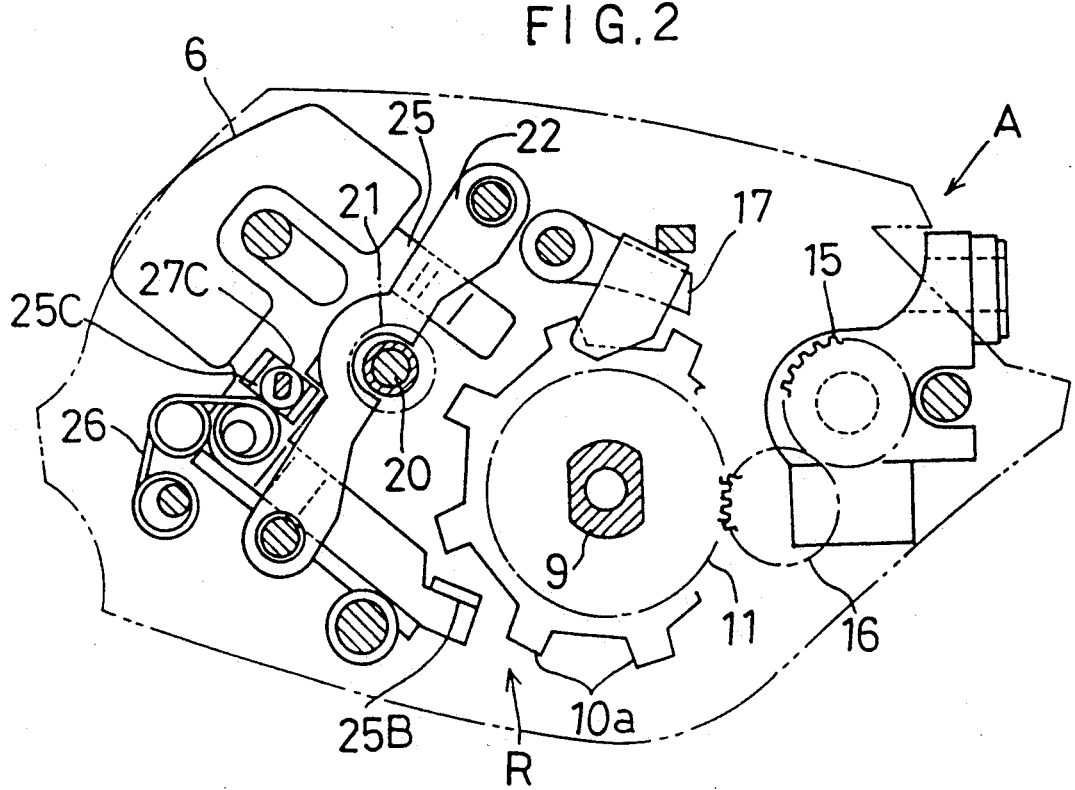
FIG. 2 is a side view of the clutch operating system in a declutching state.

As shown in FIGS. 1 and 2, a shifter 22 is supported on a pair of support shafts 23 for sliding the slide element 21. The support shafts 23 carry springs 24 mounted thereon, respectively, for moving the shifter 22 to a clutch engaging position.

The push knob 6 is connected to an end of a control plate 25 which defines a pair of cam surfaces 25A for moving the shifter 22 to a declutching position. The control plate 25 further includes a contact piece 25B acting as a restoring device R for contacting a tooth 10a of the ratchet wheel 10 when the handle 7 is turned in the line winding direction. to slide the control plate 25 to the clutch engaging position. A toggle spring 26 acts on the control plate 25 to maintain the control plate 25 in the respective control positions.

Figure 3:
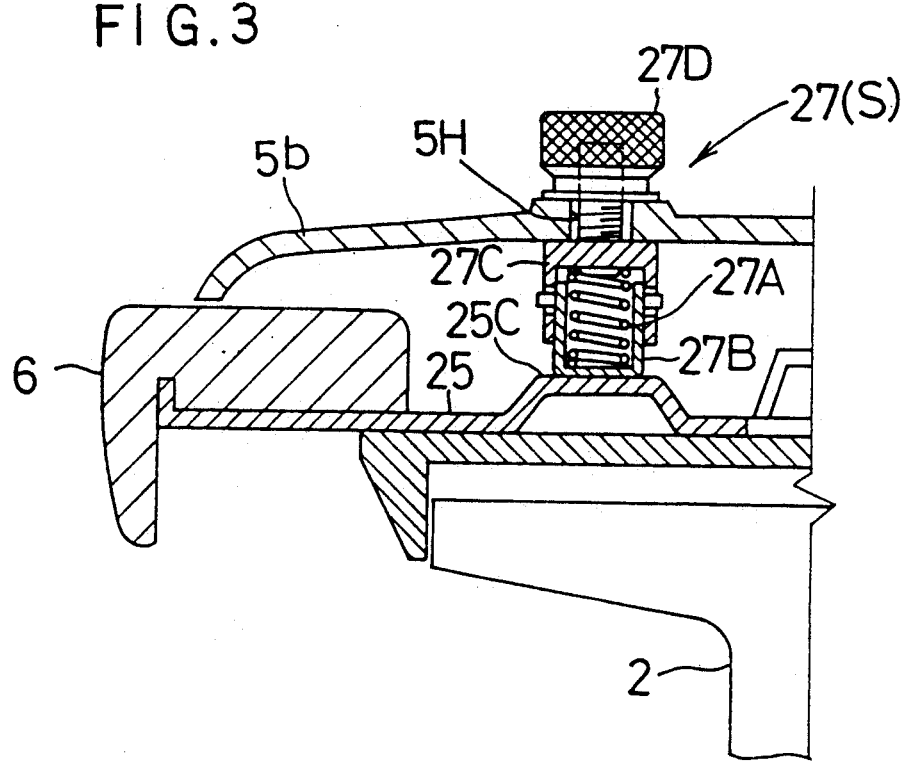
FIG. 3 is a sectional view of a checking device.
Figure 4:
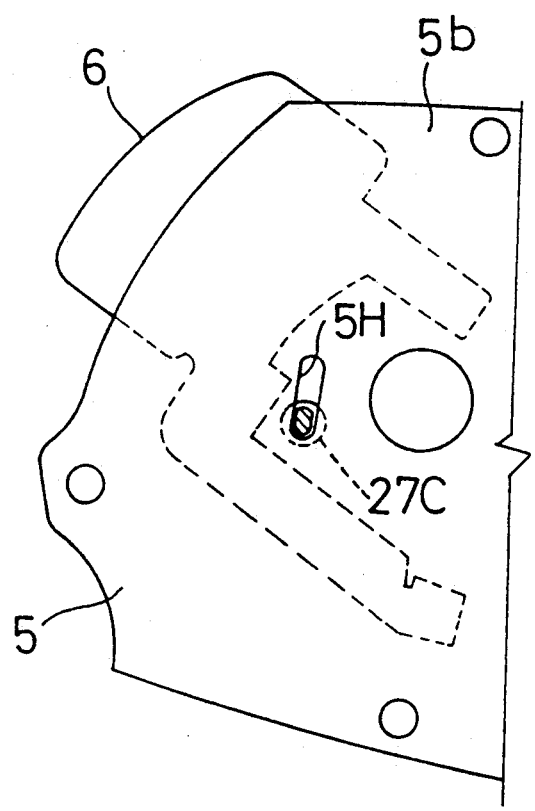
FIG. 4 is a side view showing a slot formed in an outer wall.

As shown in FIGS. 3 and 4, the control plate 25 includes a friction surface 25c projecting from a lateral surface thereof. The outer wall 5B of the right side case 5 includes a friction mechanism 27 acting as a checking device S for contacting the friction surface 25c to check movement of the control plate 25 to the clutch engaging position.

The friction mechanism 27 includes a contact piece 27B urged by a spring 27A to project from the outer wall 5B, a holder 27C, and a control knob 27D. The friction mechanism 27 is slidable along a slot 5H defined in the outer wall 5b between a position to apply a braking force to the control plate 25 and a position not to apply the braking force.

This friction mechanism 27 may employ a construction for adjusting its pressing force.

With this reel, therefore, the friction mechanism 27 checks the movement of the control plate 25 to the clutch engaging position when a torque is applied to the handle 7 in the line winding direction at a casting time. Consequently, despite the operating force from the restoring device R, the control plate 25 does not move to the clutch engaging position and the clutch mechanism C remains disengaged.

Apart from the foregoing embodiment, the present invention may be worked as shown in FIGS. 6 through 10.

Figure 6:
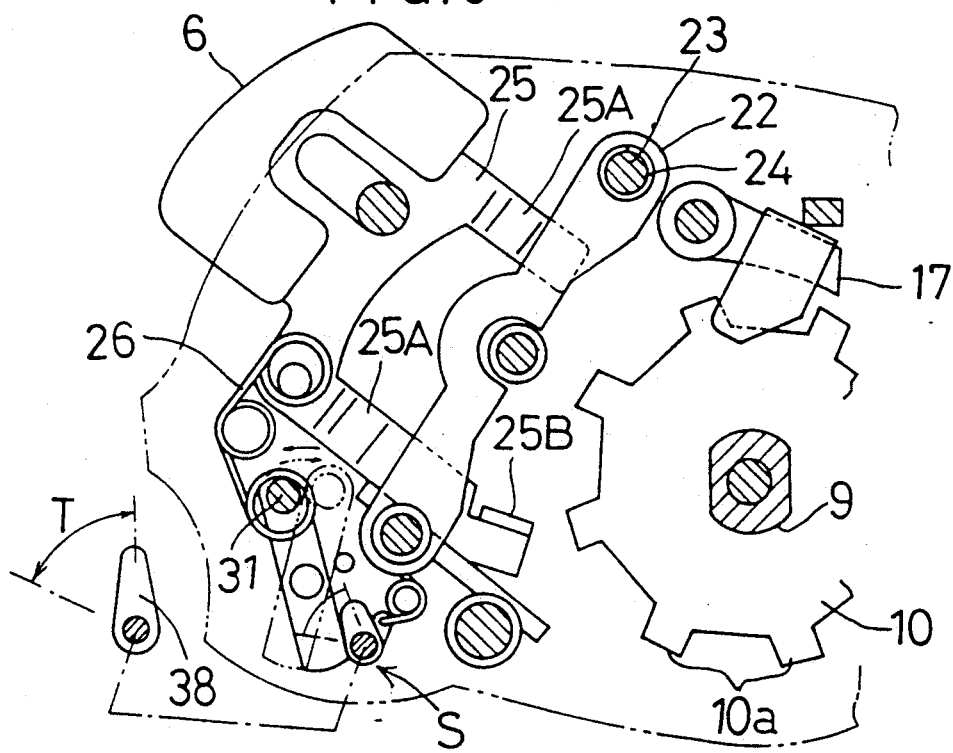
FIG. 6 is a side view showing another embodiment having a checking device formed of a toggle spring.

The modified embodiment shown in FIG. 6 provides such interlocking relations that the control plate 25 does not reach the clutch engaging position merely by an operating stroke of the contact piece 25B when the handle 7 is turned in the line winding direction. A movable pin 31 is provided to vary a position for supporting the end of the toggle spring 26 remote from the control plate 25. The position in which the toggle spring 26 engages the control plate 25 is switchable between a position beyond a dead point of the toggle spring 26 and a position inwardly of the dead point by movement of the control plate 25 occurring when the handle 7 is turned in the line winding direction. When the movable pin 31 is set to the position inwardly of the dead point (as shown in solid lines in FIG. 6), the clutch mechanism C is not engaged also when the handle 7 is turned in the line winding direction.

In this embodiment, the construction for adjusting the position of the movable pin 31 corresponds to the checking device S.

Figure 7:
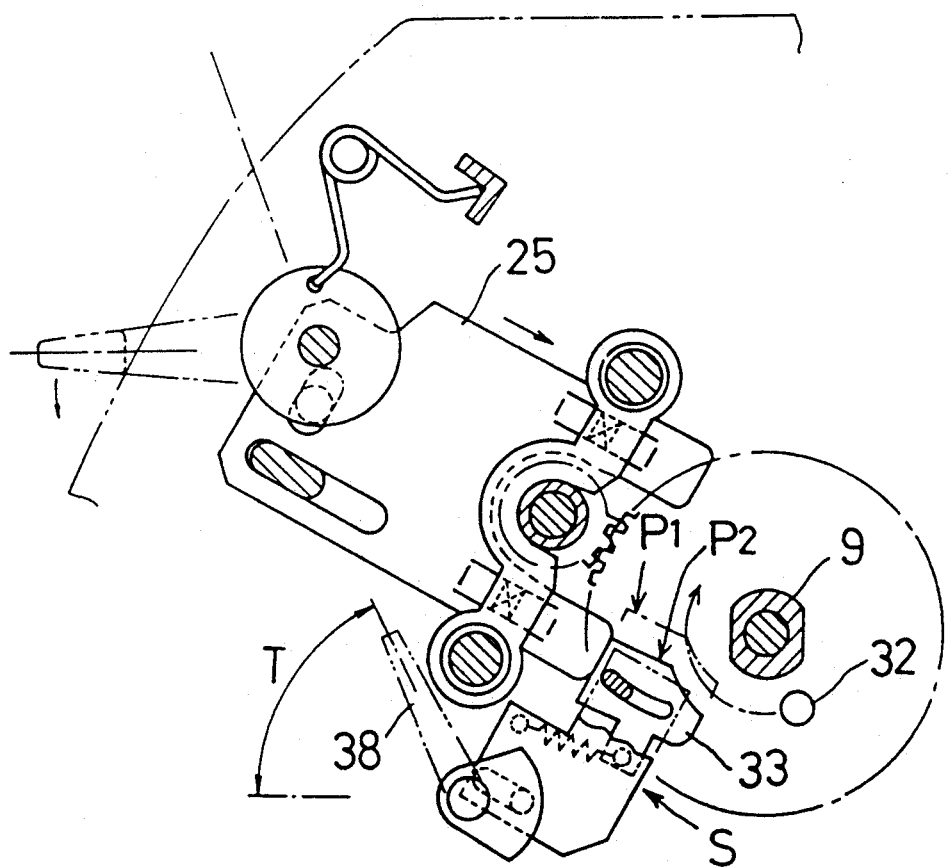
FIG. 7 is a side view of a further embodiment having a checking device formed of a switching piece.

The embodiment shown in FIG. 7 includes a pin 32 projecting from an element rotatable with the handle shaft 9. A switching piece 33 is provided which is switchable between a position P1 to transmit a turning force of the pin 32 to the control plate 25 and a position P2 not to transmit the turning force. The switching piece 33 is set to the position P2 not to transmit the turning force of the pin 32 to the control plate 25, in order to prevent the clutch mechanism C from becoming engaged when the handle 7 should be turned by some cause at a casting time.

In this embodiment, the switching piece 33 and the construction for adjusting the position of the switching piece 33 correspond to the checking device S.

Figure 8:
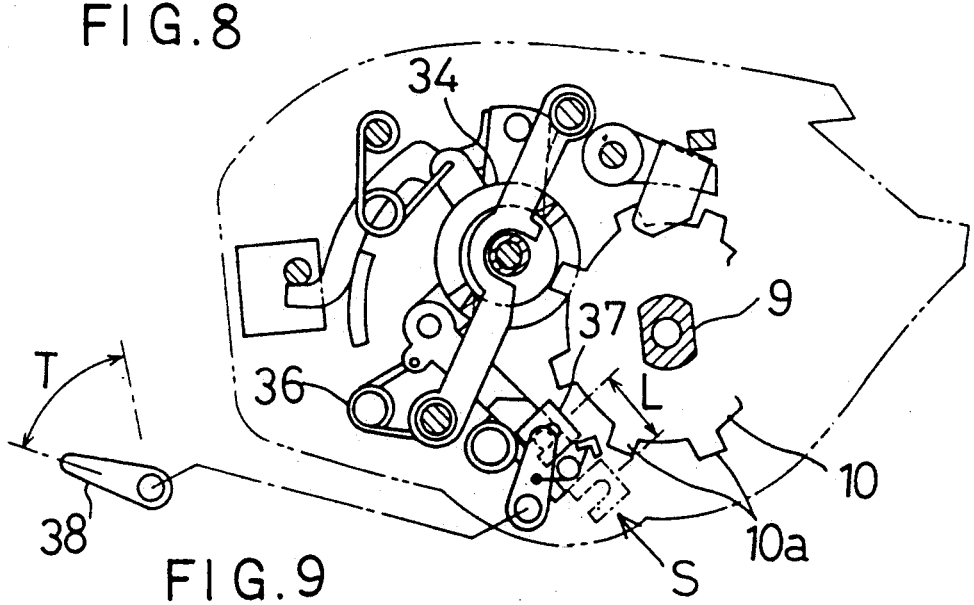
FIGS. 8 through 10 are views showing operation of a still further embodiment having a checking device formed of a limiter piece.
Figure 9:
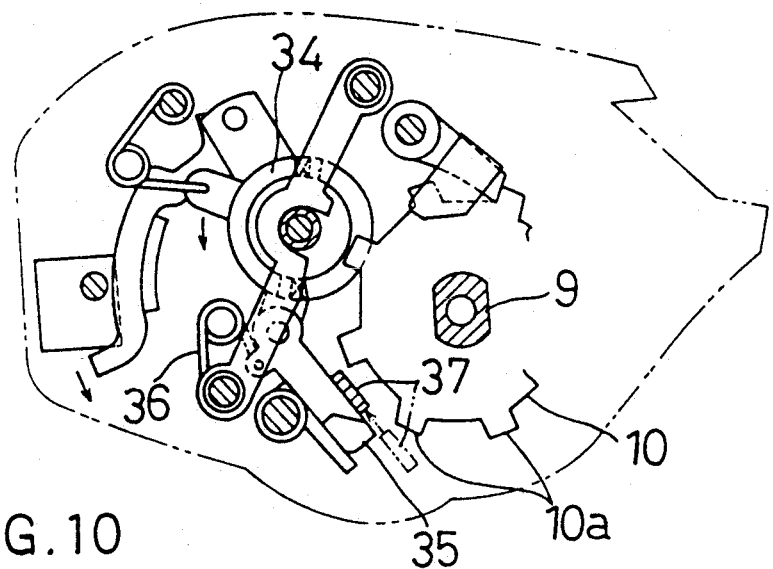
Figure 10:
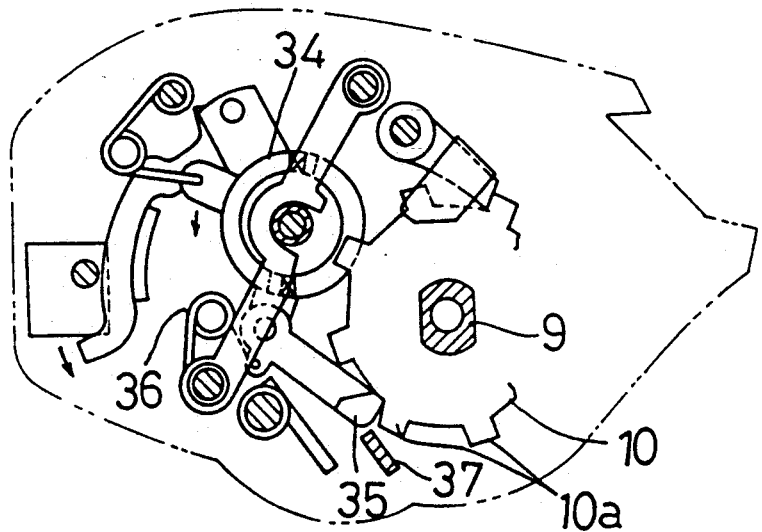

The embodiment shown in FIGS. 8 through 10 includes a pivoting type clutch control element 34, and an arm 35 connected to the clutch control element 34 to be switchable between a position to contact the teeth 10a of the ratchet wheel 10 and a position not to contact the teeth 10a. A second toggle spring 36 is provided to switch the arm 35 to the position to contact the teeth 10a when the clutch control element 34 is moved to a declutching position (FIG. 9). Further, a slidable limiter piece 37 is provided to maintain the arm 35 in the position not to contact the teeth 10a when the clutch control element is moved to the declutching position. As in the above embodiment, the limiter piece 37 is set to a position to maintain the arm 35 in the position not to contact the teeth 10a, in order to prevent the clutch mechanism C from becoming engaged when the handle 7 should be turned at a casting time.

In this embodiment, the limiter piece 37 corresponds to the checking device S.

In each of the illustrated modifications, the checking device S is switchable between the operative position and inoperative position by turning a controller 38 through a stroke T.

In these modified embodiments, like parts are labeled with like reference numerals with respect to the embodiment shown in FIGS. 1 through 5.

What is claimed is:

1. A baitcasting reel comprising:
   right and left side cases;
   a spool and a spool shaft;
   a handle;
   a level wind mechanism;
   a clutch mechanism for establishing and breaking drive transmission from said handle to said spool, said clutch mechanism including an engaging portion defined in said spool shaft, a slide element rotatably supported by said spool shaft, a shifter, and a control plate, said clutch mechanism being shiftable between clutching and declutching positions, said engaging portion being engaged with said slide element when said clutch mechanism is in the clutching position, said engaging portion being disengaged from said slide element when said clutch mechanism is in the declutching position;
   restoring means for shifting said clutch mechanism to the clutching position, said restoring means including a ratchet wheel rotatable in unison with said handle, said ratchet wheel having peripheral teeth, said restoring means being arranged such that said control plate is moved by said teeth of said ratchet wheel when said clutch mechanism is in the declutching position and said handle is rotated in a fishing line winding direction; and
   check means shiftable between a first position for allowing restoration of said clutch mechanism to the clutching position by said restoring means, and a second position for prohibiting the restoration of said clutch mechanism to the clutching position by said restoring means, such that said clutch mechanism remains in the declutching position.

2. A baitcasting reel as claimed in claim 1, wherein said control plate has a lateral surface and a friction surface projecting from said lateral surface, and wherein said check means includes a friction mechanism for contacting said friction surface.

3. A baitcasting reel as claimed in claim 2, wherein one of said side cases has an outer wall and a slot defined in said wall, and wherein said friction mechanism includes a contact piece, a resilient element for urging said contact piece in a projecting direction, a holder and a control knob, said friction mechanism being slidable along said slot, and said friction mechanism being selectively maintained between a first position for allowing said contact piece to contact said friction surface to apply a braking force, and a second position for preventing said contact piece from contacting said friction surface.

4. A baitcasting reel as claimed in claim 1, further comprising a handle shaft, an element rotatable with said handle shaft, and a pin projecting from said element, and wherein said check means includes said pin and a switching piece, and means for switching said switching piece between a position to transmit a turning force from said pin to said control plate and an inoperative position, said switching piece being set to the inoperative position to prevent said clutch mechanism from moving to the clutching position.

5. A baitcasting reel as claimed in claim 1, wherein said restoring means further includes a contact piece disposed at an extreme end of said control plate, and wherein said teeth of said ratchet wheel come into contact with said contact piece when said clutch mechanism is in the declutching position and said handle is rotated in the fishing line winding direction to thereby move said control plate and restore said clutch mechanism to the clutching position.

6. A baitcasting reel as claimed in claim 1, wherein said check means includes a toggle spring and a movable pin, said toggle spring being supported by said control plate and said movable pin, said toggle spring having a dead point, and wherein said check means includes means for switching said toggle spring between a first position beyond said dead point and a second position inwardly of said dead point.

7. A baitcasting reel as claimed in claim 1, wherein said check means includes an arm, a slidable limiter piece, a toggle spring for urging said arm toward said ratchet wheel, and a control element for switching said limiter piece from a first position for allowing said arm to engage said teeth to a second position for preventing said arm from engaging said teeth.

* * * * *